US012061270B2

(12) United States Patent
Averin et al.

(10) Patent No.: US 12,061,270 B2
(45) Date of Patent: Aug. 13, 2024

(54) METHOD AND APPARATUS FOR DETECTING GNSS SPOOFING

(71) Applicant: Topcon Positioning Systems, Inc., Livermore, CA (US)

(72) Inventors: Sergey V. Averin, Moscow (RU); Andrey V. Plenkin, Moscow (RU); Konstantin Ebauer, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 16/757,524

(22) PCT Filed: Nov. 7, 2019

(86) PCT No.: PCT/RU2019/000795
§ 371 (c)(1),
(2) Date: May 25, 2022

(87) PCT Pub. No.: WO2021/091414
PCT Pub. Date: May 14, 2021

(65) Prior Publication Data
US 2024/0219577 A1    Jul. 4, 2024

Related U.S. Application Data

(60) Provisional application No. 62/915,090, filed on Oct. 15, 2019.

(51) Int. Cl.
*G01S 19/21* (2010.01)
*G01S 19/36* (2010.01)
*G01S 19/43* (2010.01)

(52) U.S. Cl.
CPC ............ *G01S 19/215* (2013.01); *G01S 19/36* (2013.01); *G01S 19/43* (2013.01)

(58) Field of Classification Search
CPC ......... G01S 19/215; G01S 19/36; G01S 19/43
USPC ...................................................... 342/357.59
See application file for complete search history.

(56) References Cited

U.S. PATENT DOCUMENTS

2018/0372879 A1*  12/2018  Whitehead ............ G01S 19/215

FOREIGN PATENT DOCUMENTS

| CN | 105717492 A | * | 6/2016 | ............... G01S 7/36 |
| EP | 2746813 A1 | * | 6/2014 | .......... G01S 19/215 |
| WO | WO-2019162839 A1 | * | 8/2019 | .......... G01S 19/215 |

* cited by examiner

*Primary Examiner* — Harry K Liu
(74) *Attorney, Agent, or Firm* — Bardmesser Law Group

(57) ABSTRACT

An apparatus for detecting global navigation satellite system (GNSS) spoofing, including a GNSS receiver that includes a first radio-frequency front-end (RF1) connected to antenna 1; a second radio-frequency front-end (RF2) connected to antenna 2; a digital section connected to both RF1 and RF2 and controlled with a single frequency oscillator. The digital section generates a first set of GNSS raw measurements based on signals received from antenna 1; generates a second set of GNSS raw measurements based on signals received from antenna 2; computes single differences between simultaneous raw measurements, generated with the signals received from the antenna 1 and the antenna 2 for the same GNSS satellite; compares the single differences with a threshold; and issues a spoofing alert when more than one of the single differences is below a threshold.

24 Claims, 9 Drawing Sheets

METHOD AND APPARATUS FOR DETECTING GNSS SPOOFING

BACKGROUND OF THE INVENTION

Field of the Invention

The present invention relates generally to global navigation satellite systems (GNSS), and more particularly, to a method and apparatus for detecting spoofing of GNSS devices.

Background of the Related Art

The equipment that receives signals of global navigation satellite systems (GNSSs) can determine target parameters, such as position, velocity, time (PVT). Examples of currently deployed global navigation satellite systems include Global Positioning System (GPS) of the United States of America and the GLONASS of Russian Federation. Other global navigation satellite systems, such as the European GALILEO and the Chinese Beidou, are under development. In a GNSS, a navigation receiver receives and processes radio signals transmitted by satellites located within a line-of-sight of the receiver. The satellite signals comprise carrier signals modulated by pseudo-random binary codes. The receiver measures the time delays of the received signals relative to a local reference clock, or oscillator. Code phase measurements enable the receiver to determine the pseudo-ranges between the receiver and the satellites. The pseudo-ranges differ from the actual ranges (distances) between the receiver and the satellites due to an offset, caused by the shift between the time scales of the GNSS and the receiver.

Measured pseudo-ranges along with other parameters measured by receiver are referred to as raw measurement data. If signals are received from a sufficiently large number of satellites, then the measured pseudo-ranges can be processed to determine the coordinates and the offset caused by the shift between the time scales of the GNSS and the receiver. This operational mode is referred to as a stand-alone mode, since the measurements are determined by a single receiver. A stand-alone system typically provides a position accuracy of about a meter.

To improve the position accuracy, differential navigation (DN) systems have been developed. In a DN system, the position of a user is determined relative to a base station, also referred to as a base. The base is typically fixed, and the coordinates of the base are precisely known; for example, by surveying. The base contains a navigation receiver that receives satellite signals and that can compute the corrections to GNSS measurements based on the known base position. In some DN systems, the raw measurement data of the base can serve as corrections.

The user, whose position is to be determined, can be stationary or mobile. In a DN system, the user is often referred to as a rover. The rover also contains a navigation receiver that receives GNSS satellite signals. Corrections generated at the base are transmitted to the rover via a communications link. To accommodate a mobile rover, the communications link is often a wireless link. The rover processes the corrections received from the base, along with measurements taken with its own receiver, to improve the accuracy of determining its position.

Accuracy is improved in the differential navigation mode because errors incurred by the receiver at the rover and by the receiver at the base are highly correlated. Since the coordinates of the base are accurately known, measurements from the base can be used for calculating corrections, thus compensating for the errors at the rover. If a DN system generates corrections to pseudo-ranges measured with code phase only, such a DN system is capable to provide a position accuracy on the order of tens of centimeters.

The position accuracy achieved with data generated by a DN system can be further improved, if a DN system, in addition to corrections based on pseudo-ranges measured with code phase, generates corrections based on pseudo-ranges measured with carrier phase. Carrier phase measurements along with code phase measurements are a part of raw measurement data, generated by the receiver. Improvement in positioning accuracy is achieved because pseudo-ranges measured with carrier phase have ~100 times smaller noise and multipath measurement errors, compared with pseudo-ranges measured with code phase. A differential navigation system that computes positions based on real-time carrier phase pseudo-range measurements, in addition to the code phase pseudo-range measurements, is often referred to as a real-time kinematic (RTK) system.

As a result of a DN system operation, the position of a rover is determined with an improved accuracy, but this accuracy is relative, and depends on accuracy of the base position. So, any offset of the known base position from the truth will translate into the same offset of a rover position. In other words, components of the "base-to-rover" vector can be determined precisely in a given reference frame, and then, these components should be applied to base position (not necessarily precise) in order to compute position of the rover.

GNSS signals are vulnerable to interference. In most severe cases, interference might totally block reception of GNSS signals. Such a susceptibility of GNSS signals to interference can be used by a culprit in order to intentionally block operation of GNSS device. The artificially induced interference, which aims at blocking reception of GNSS signals, is often termed as jamming.

There is another type of artificially induced interference, which is called "spoofing." There can be several types of spoofing: denial-of-service GNSS spoofing and deception GNSS spoofing.

Denial-of-service GNSS spoofing is sometimes referred to as smart-jamming, and occurs when interfering signals look identical to authentic GNSS signals, but contain inconsistent or blank navigation information. In most cases, the impact of denial-of-service GNSS spoofing is easily distinguished by GNSS receiver navigation algorithms based on measurement consistency checks.

Deception GNSS spoofing is when interfering signals are indistinguishable from authentic GNSS signals, and contain consistent navigation information. The aim of deception GNSS spoofing is to guide a GNSS user to the wrong location so that receiver navigation algorithms are incapable to detect the fact of relying on spoofed signals and data.

Successful deception GNSS spoofing attack are described in "Cockrell School Researchers Demonstrate First Successful "Spoofing" of UAVs", www.engr.utexas.edu/news/archive/7302-humphreysspoofing, accessed Oct. 5, 2019, and in "UT Austin Researchers Spoof Superyacht at Sea", www.engr.utexas.edu/news/archive/7649-superyacht-gps-spoofing, accessed Oct. 5, 2019.

Further, in the text, only deception GNSS spoofing is discussed, and a term "spoofing" is used in the sense of deception GNSS spoofing.

Various approaches to detection and mitigation of spoofing are known.

In EP 3428 688 A1, entitled "System for Detection and Mitigation of Spoofing Attacks in GPS Navigation", a system is described that uses adaptive phased antenna array and a relevant receiver logic to identify the direction to a spoofer and to attenuate GNSS signals, coming from that direction.

In WO 2013/003517 A2, entitled "Methods and Systems for Detecting GPS Spoofing Attacks", a system is described which is based on comparison of GNSS and inertial navigation system (INS) data, and in case of mismatch in these data, a spoofing alert is triggered.

US 20190154839 A1, entitled "Spoofing detection and rejection," suggests analyzing different characteristics of GNSS signals in order to detect the spoofed signals. These signal characteristics are signal correlation peaks, signal-to-noise ratios, and measurement noise values. Also, false GNSS satellites which are tracked by the rover, but in fact should not be tracked, are detected based on almanac data imported from a trusted source.

In US 20190235086 A1, entitled "System and Method for Detecting GPS Signal Spoofing," a methodology is described in which spoofing is detected based on analysis of signal-to-noise ratios and unexpected changes in positions, determined between subsequent instants of time.

In "A Combined Symmetric Difference and Power Monitoring GNSS Anti-Spoofing Technique", by Todd Humphreys et al., Preprint of the 2013 IEEE Global Conference on Signal and Information Processing (GlobalSIP), Austin, TX, Dec. 3-5, 2013, a technique is described in which spoofing signal power increase and correlation distortions are monitored at the same time.

In US 20150226858 A1, entitled "GPS Spoofing Detection Techniques", a technique is described that is based on computing positions of several spatially separated rovers, and if a distance between them falls below a certain threshold, a decision on spoofing existence is made.

The approach described in the present application is different from all the above approaches.

The approach is based on the fact that a single spoofing source affects identically all receiving devices in the area. The most obvious solution here is to compare positions, computed for two or more antennas and in case the difference is close to zero, to report a spoofing alert. But an alternative approach is suggested based on analysis of raw code phase and carrier phase measurement data, such that no carrier phase ambiguity resolution is needed while the accuracy of a decision is high.

SUMMARY OF THE INVENTION

Accordingly, the present invention is directed to detecting spoofing of the GNSS signal.

The concept is based on the idea that a single spoofing source affects identically all receiving devices in the area. The fact of spoofing is detected based on two different approaches. The first approach is to use receiver with two, or more front-ends, connected to different antennas, and a single digital section, controlled with a single frequency standard.

The second approach is to use two or more independent receivers, connected to different antennas, linked to each other via communication interface.

Both approaches are based on generating a specific combinations of raw measurements, collected simultaneously with two different antennas, and a comparison of these combinations with a threshold. In case the combinations are below a threshold, a spoofing alert will be generated.

The above combinations can be formed for both code phase and carrier phase measurements, but usage of carrier phase measurements provides better accuracy, wherein the advantage of the described methodology is that no ambiguity resolution is required.

BRIEF DESCRIPTION OF THE ATTACHED DRAWINGS

The attached drawings that further describe the present invention are incorporated in and constitute a part of specification, illustrate embodiments of the invention and together with the description serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

The equipment that receives signals of global navigation satellite systems (GNSSs) can operate in various operational modes. Different operational modes require equipment of different complexities capable of determining target parameters (such as position, velocity, time and attitude) with different accuracies. The types and quantities of data to be processed also depend on the operational mode. Several operational modes are summarized below.

Figure 1A:
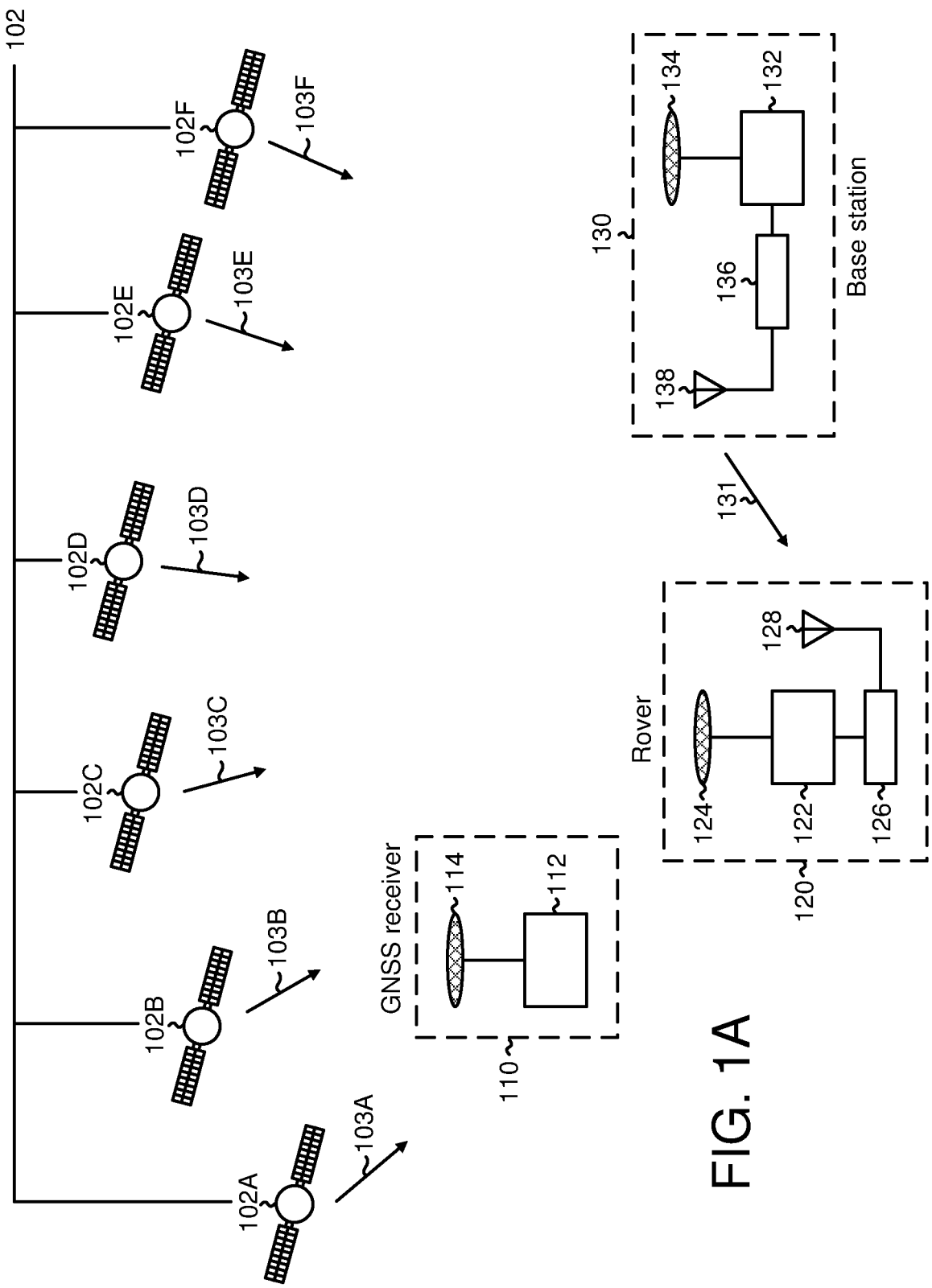
FIG. 1A shows an example of a global navigation satellite system in which the navigation receiver operates in a stand-alone mode or in a single-base-station differential navigation mode.

FIG. 1A shows a high-level schematic of a global navigation satellite system (GNSS). A constellation of global navigation satellites 102 transmits navigation signals. Shown are six representative navigation satellites, denoted 102A-102F, which transmit navigation signals 103A-103F, respectively. In general, the navigation satellites can belong to more than one global navigation satellite system (for example, GPS and GLONASS).

Referring now to the GNSS measurement unit 110, which operates in a stand-alone mode, the GNSS measurement unit 110 includes an antenna 114 and a navigation receiver 112. The antenna 114 receives navigation signals, such as navigation signals 103A-103F; from these navigation signals, the navigation receiver 112 can calculate target parameters, such as precision time referenced to a GNSS system clock and position and velocity referenced to the antenna 114. In some GNSS measurement units, the antenna is mounted in a fixed relationship with respect to the navigation receiver. If the GNSS measurement unit 110 is carried by a person who is walking or running, the GNSS measurement unit 110 can be used to calculate the position and velocity of the person as a function of time. If the GNSS measurement unit 110 is mounted on a moving vehicle, the GNSS measurement unit 110 can be used to calculate the position and velocity of the vehicle as a function of time.

In other GNSS measurement units, the antenna can be moved with respect to the navigation receiver. In one application, the antenna 114 is mounted on the blade of a bulldozer, and the navigation receiver 112 is mounted inside the cab of the bulldozer; the antenna 114 is coupled to the navigation receiver 112 via a flexible cable. The GNSS measurement unit 110 can then be used to measure the position and velocity of the blade as a function of time. To simplify the discussion below, phrases such as "position of the navigation receiver" or "position and velocity of the navigation receiver" are used; strictly, however, "position" and "velocity" refer to the parameters of the antenna that receives the navigation signals that are then processed by the navigation receiver.

The navigation signals comprise carrier phase signals modulated by pseudo-random binary codes. The navigation receiver measures the time delays of the received signals relative to a local reference clock or oscillator. Code phase measurements enable the navigation receiver to determine the pseudo-ranges, which in essence are estimates of the distances between the navigation receiver and the navigation satellites. The pseudo-ranges differ from the actual ranges (distances) between the navigation receiver and the navigation satellites due to the offset between the time scales of the navigation receiver and the respective GNSS.

If navigation signals are received from a sufficiently large number of navigation satellites, then the measured pseudo-ranges can be processed to determine the position of the navigation receiver. In general, the three-dimensional coordinates of the navigation receiver can be determined; a reference Cartesian coordinate (x, y, z) system can be used. The reference Cartesian coordinate system can be an Earth Centered Earth Fixed (ECEF) system; WGS-84 is an example of an ECEF system. Two-dimensional coordinates along a reference horizontal plane (x-y plane) or a one-dimensional coordinate (z or height) along an axis normal to the reference horizontal plane can also be determined. The reference horizontal plane can, for example, be tangent to the WGS-84 ellipsoid. A time referenced to a GNSS system clock can also be calculated by the navigation receiver from the navigation signals (which contain timing information). Velocity of the navigation receiver can be calculated by taking the time derivative of position as a function of time, by processing Doppler measurements, or by processing carrier phase measurements over a specific interval of time.

Various error sources contribute to errors in determination of the position, velocity and time. Examples of error sources include satellite clock errors, satellite ephemeris errors, and variations in propagation velocities of the navigation signals due to the ionosphere and troposphere. Time scales of the navigation satellites are referenced to precision atomic on-board clocks and are synchronized with the GNSS time scale; however, there are residual satellite-specific drifts and offsets with respect to that GNSS time scale. Calculations of position, velocity, and time using pseudo-ranges require ephemeris data (orbital positions of the satellites); ephemeris data is encoded on the navigation signals, and is updated in real time periodically. Measured pseudo-ranges are affected by the propagation velocity of the navigation signals between the navigation satellites and the navigation receiver. The propagation velocity depends on the medium and varies as the navigation signal travels through the ionosphere and through the troposphere; instabilities in the ionosphere and troposphere can result in dynamic changes to the propagation velocity.

Some errors can be reduced by operating the GNSS in a differential navigation (DN) mode. Refer again to FIG. 1A. The GNSS measurement unit 130, also referred to as the base station (or base) 130, is fixed or stationary; its coordinates are precisely known (for example, from high-precision surveying measurements). The GNSS measurement unit 120, also referred to as the rover 120, in general is mobile.

The base station 130 includes the antenna 134 and the navigation receiver 132. The antenna 134 receives navigation signals 103A-103F. The base station 130 also includes the communications transceiver 136 and the antenna 138. Similarly, the rover 120 includes the antenna 124 and the navigation receiver 122. The antenna 124 receives the navigation signals 103A-103F. The rover 120 also includes the communications transceiver 126 and the antenna 128. The base station 130 transmits the communications signal 131 (for example, a radio frequency signal) from the antenna 138. The rover 120 receives the communications signal 131 at the antenna 128.

From the received navigation signals, the navigation receiver 132 at the base station 130 can calculate corrections to the received GNSS measurements with respect to the known position of the base station 130. In some DN systems, raw measurement data of the base station can serve as corrections. If the distance between the base station 130 and the rover 120 is relatively small, then many of the errors at the base station 130 and at the rover 120 are correlated. The base station 130 transmits error correction data to the rover 120 via the communications signal 131. The error correction data includes data that can be used to correct errors from the various error sources discussed above, for example. The rover 120 processes the navigation signals and the error correction data to determine the position of the rover 120. The accuracy with which the rover 120 can determine its position in the differential navigation mode is higher than the accuracy with which the GNSS measurement unit 110 can determine its position in the stand-alone mode.

A DN system that broadcasts correction data to code phase pseudo-range measurements is often referred to as a differential global positioning system (DGPS), or a differential global navigation satellite system (DGNSS). The position determination accuracy, achieved with help of a DN system can be further improved if correction data for code phase pseudo-ranges measurements is supplemented with the correction data for carrier phase pseudo-ranges measurements.

If the carrier phases of the signals transmitted by the same satellites are measured by both the navigation receiver in the base station and the navigation receiver in the rover, processing the two sets of carrier phase measurements can yield a position accuracy to within several percent of the carrier's wavelength. A DN system, which enables positioning based on real-time carrier phase pseudo-range measurements, in addition to the code phase pseudo-range measurements, is often referred to as a real-time kinematic (RTK) system. Processing carrier phase measurements to determine position includes the step of ambiguity resolution (AR); that is, determining the integer number of cycles in the carrier phase signals received by the navigation receivers from an individual satellite.

More complex DN systems, including RTK systems, are configured as network DN systems. In a network DN system, error correction data for a rover is generated from measurements collected from a group of base stations that are geographically dispersed over a wide area. A network control center processes the measurements from the group of base stations and transmits the error correction data to the rover via various communications links, such as radiofrequency satellite signals or General Packet Radio Service (GPRS). Network DN systems can differ by application areas, data processing methodology and target positioning accuracy.

Figure 1B:
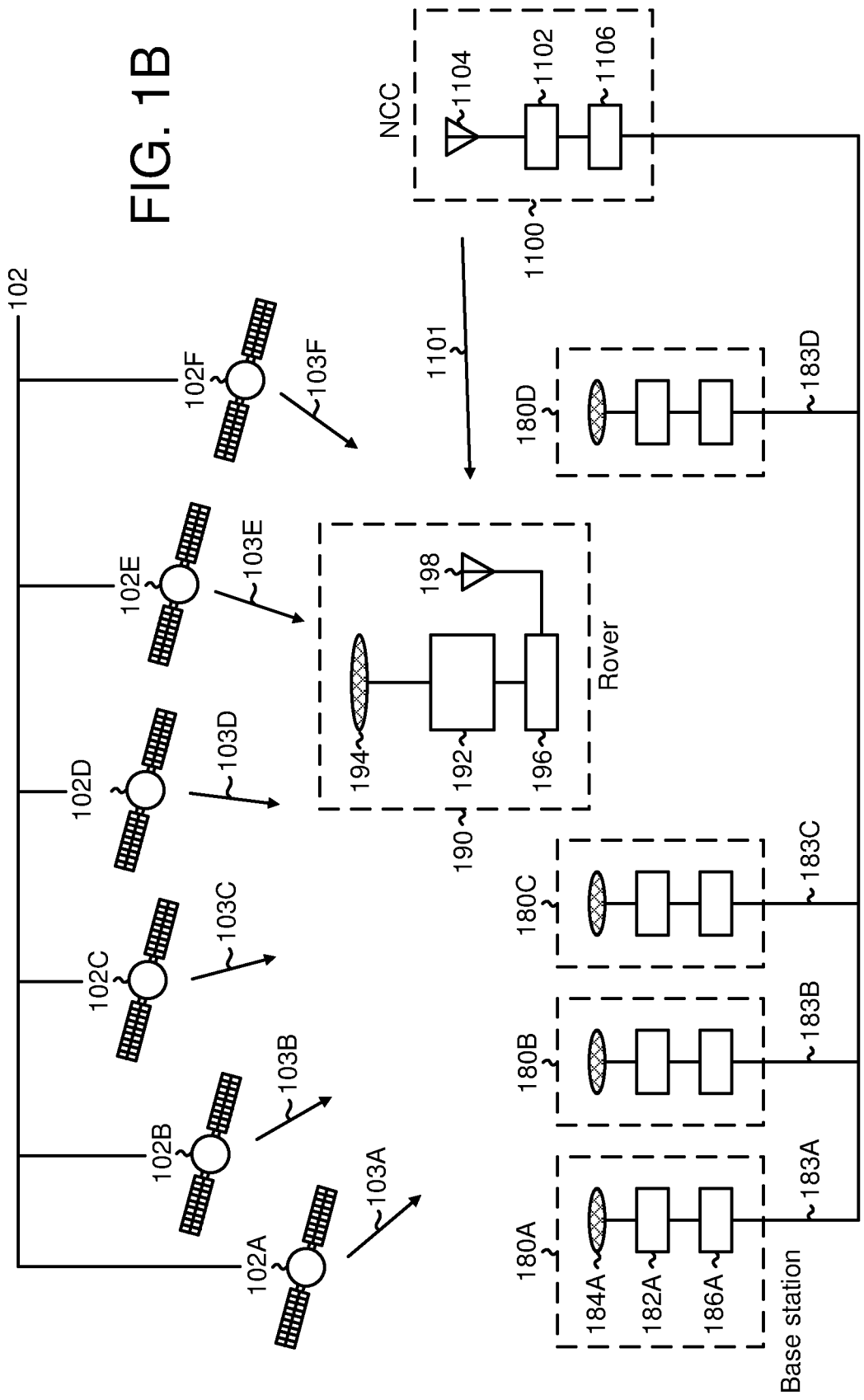
FIG. 1B shows an example of a global navigation satellite system in which the navigation receiver operates in a network differential navigation mode.

FIG. 1B shows an example of a regional (local) network DN system used to provide a network RTK solution; such systems are often referred to as Network RTK systems. Shown are the rover 190 and four representative base stations 180A-180D. The rover 190 includes the antenna 194 and the navigation receiver 192. The antenna 194 receives the navigation signals 103A-103F. The rover 190 also includes the communications transceiver 196 and the antenna 198. The base station 180A includes the navigation receiver 182A, the antenna 184A, and the data processing and communications unit 186A; base stations 180B-180D are each similar to the base station 180A.

In general, the rover and each base station can receive navigation signals from a slightly different subset of navigation satellites in the constellation 102 due to varying conditions in different locations. Operation of the rover in a network RTK mode is possible, however, only using satellite signals received simultaneously by the rover 190 and by the base stations 180A-180D.

Base stations 180A-180D transmit data 183A-183D, respectively, to the network control center (NCC) 1100. The data can be transmitted via communications links or via a communications network. The NCC 1100 includes the communications transceiver 1102, the antenna 1104, and the data processing and communications unit 1106. The NCC 1100 receives the data from the base stations, as well as the approximate position of the rover, and processes the data according to specific algorithms to generate a consolidated set of error correction data corresponding to the rover position (described in more detail below).

The NCC 1100 makes the consolidated set of error correction data available to the rover via various communication channels, such as GPRS. In FIG. 1B, the NCC 1100 delivers the consolidated set of error correction data via the communications signal 1101 (for example, a radio frequency signal) transmitted from the antenna 1104. The rover 190 receives the communication signal 1101 at the antenna 198. The rover 190 then calculates its position based on measurements collected with its receiver and the consolidated set of error correction data.

The consolidated set of error correction data in network RTK systems can be partitioned into several groups. The consolidated set of error correction data can include:

Cumulative corrections to both code phase and carrier phase measurements from one or more individual base stations in a group of base stations;

Corrections to code phase and carrier phase measurements for some virtual (i.e., non-existent) base station generated from processing GNSS measurements collected with a group of base stations;

Corrections representing the dispersive part of GNSS measurement errors (measurement errors attributable to the ionosphere) for measurements from one or more individual base stations in a group of base stations;

Corrections representing the non-dispersive part of GNSS measurement errors (measurement errors attributable to the troposphere, satellite ephemeris, and satellite clock data) for measurements from one or more individual base stations in a group of base stations;

Coefficients approximating how various GNSS measurement error components change in space; and Auxiliary information, like evaluated hardware-induced biases, station ID, textual information on hardware or software of service provider, etc.

Figure 1C:
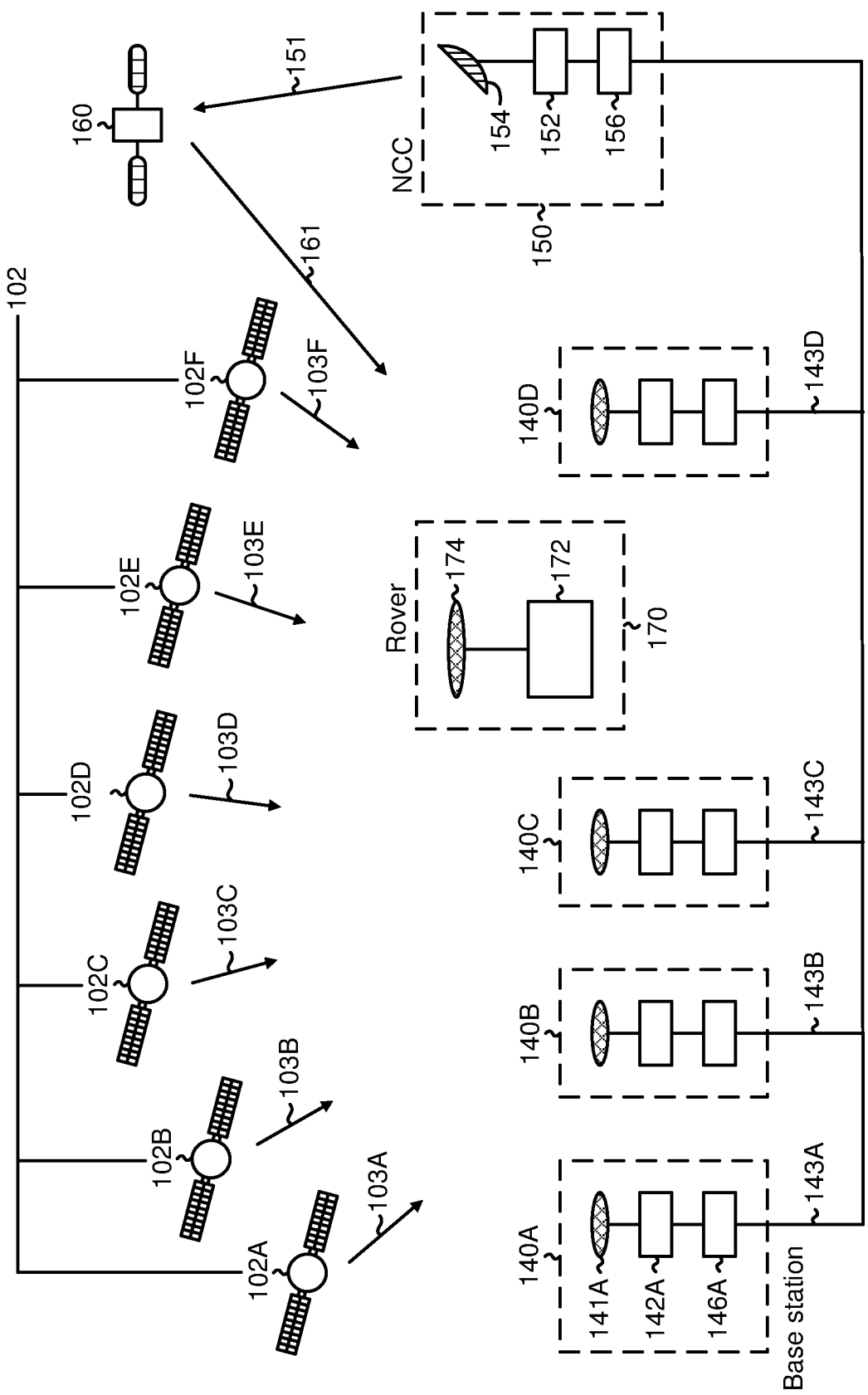
FIG. 1C shows an example of a global navigation satellite system in which the navigation receiver operates in a satellite-based network differential navigation mode.

FIG. 1C shows another example of a network DN system, referred to as a Space Based Augmentation System (SBAS). Shown are the rover 170 and four representative base stations 140A-140D. The rover 170 includes the antenna 174 and the navigation receiver 172. The base station 140A includes the navigation receiver 142A, the antenna 141A, and the data processing and communications unit 146A; base station 140B-base station 140D are each similar to the base station 140A. In general, the rover and each base station can receive navigation signals from a slightly different subset of navigation satellites in the constellation 102 due to varying conditions in different locations. Operation of the rover in a differential mode is possible, however, only using satellite signals received simultaneously by the rover 170 and by the base stations 140A-140D.

Base stations 140A-140D transmit data 143A-143D, respectively, to the network control center (NCC) 150. The data can be transmitted via communications links or via a communications network. The NCC 150 includes the satellite transmitter 152, the antenna 154, and the data processing and communications unit 156. The NCC 150 receives the data from the base stations and processes the data according to specific algorithms to generate a consolidated set of error correction data (described in more detail below). The NCC 150 transmits the consolidated set of error correction data to the geosynchronous (geostationary) relay satellite 160 via the satellite uplink channel 151.

The geosynchronous relay satellite 160 then retransmits the consolidated set of error correction data over a specific region (zone) of the Earth. Multiple geosynchronous relay satellites provide coverage for multiple zones. In FIG. 1C, the rover 170 receives the consolidated set of error correction data from the geosynchronous relay satellite 160 via the satellite signal 161. The rover 170 then calculates its position from the navigation signals and the consolidated set of error correction data. Note that the navigation receiver 172 in the rover 170 needs to be specially equipped to process the satellite signal 161.

The consolidated set of error correction data can be divided into several groups. The consolidated set of error correction data can include:

Corrections to code phase measurements from one or more individual base stations in a group of base stations;

Corrections to both code phase and carrier phase measurements from one or more individual base stations in a group of base stations;

Corrections to orbital (trajectory) parameters and clock parameters of GNSS satellites, specified in the processing of measurements from a group of base stations;

Corrections to code phase measurements for a some virtual (i.e., non-existent) base station generated from processing GNSS measurements for a group of base stations;

Corrections to code phase and carrier phase measurements for a virtual base station generated from processing GNSS measurements collected with a group of base stations; and Auxiliary information, like ionosphere data, evaluated hardware-induced biases, network ID, textual information on hardware or software of service provider, etc.

A third example of a network DN system, referred to as Precise Point Positioning (PPP), is similar to network RTK in some aspects, but correction data is presented differently. The architecture of the PPP system is identical to that of the SBAS. Referring to FIG. 1C, a PPP system includes a network of base stations 140A-140D distributed regionally or globally. They send their data to the network control center (NCC) 150. The NCC 150 receives the data from the base stations and processes the data according to specific algorithms to generate a consolidated set of error correction data (described in more detail below). As one option, the NCC 150 can transmit the consolidated set of error correction data to the geosynchronous (geostationary) relay satellite 160 via the satellite uplink channel 151. In another option, the NCC 150 can make the consolidated set of error correction data available to a rover via the Internet.

The key distinction between the PPP system and the typical SBAS, despite similarity in infrastructure, is different accuracy. The SBAS can provide position accuracy on the order of a meter or better; whereas, the PPP system is capable of delivering decimeter level position accuracy. In certain cases, PPP correction data sets can make possible carrier phase ambiguity resolution, thus leading to centimeter level position accuracy (similar to RTK).

The consolidated set of error correction data in a PPP system can be partitioned into several groups. The consolidated set of error correction data can include:

Corrections to orbital (trajectory) parameters of GNSS satellites specified in the processing of measurements from a group of base stations;

Corrections to clock parameters of GNSS satellites, specified in the processing of measurements from a group of base stations;

Corrections for residual uncompensated errors of GNSS measurements; and

Auxiliary information, like ionosphere data, evaluated hardware-induced biases, network ID, textual information on hardware or software of service provider, etc.

Each navigation satellite in a global navigation satellite system can transmit navigation signals on one or more frequency bands (for example, on the L1, L2, and L5 frequency bands). To simplify the terminology herein, a navigation receiver is also referred to simply as a receiver. A single-band receiver receives and processes signals on one frequency band (such as L1); a multi-band receiver receives and processes signals on two or more frequency bands (such as L1, L2, and L5). A single-system receiver receives and processes signals from a single GNSS (such as GPS); a multi-system receiver receives and process signals from two or more GNSSs (such as GPS, GLONASS, and GALILEO). See generally www.rfwireless-world.com/Terminology/GPS-Frequency-Band-and-GNSS-Frequency-Band.html, incorporated by reference herein in its entirety, regarding the GNSS frequency bands.

Figure 2:
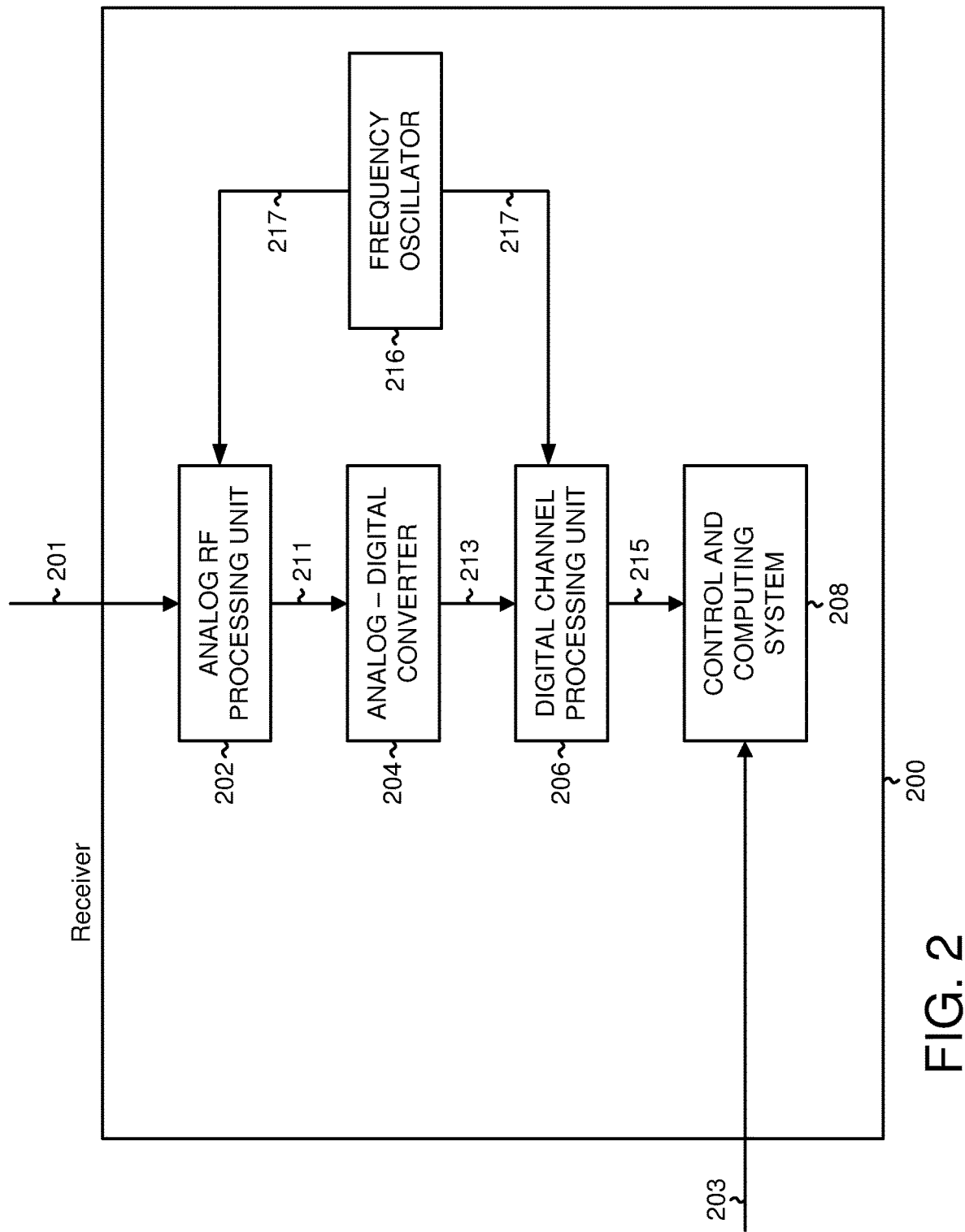
FIG. 2 shows a high-level schematic functional block diagram of a first embodiment of a navigation receiver.

FIG. 2 shows a high-level schematic functional block diagram of embodiment of a receiver 200. The input analog signal 201 represents the total signal (also referred to as the combined signal, aggregate signal, or composite signal) of all the navigation signals received by the antenna (not shown) coupled to the receiver 200. For the example shown in FIG. 1A, the input analog signal 201 includes the navigation signals 103A-103F. The input analog signal 201 is first inputted into the analog radio frequency (RF) processing unit 202. In the analog RF processing unit 202, the input analog signal 201 is filtered with a bandpass filter, centered at the frequency of navigation signals (e.g., 1575.42 MHz), and amplified by a low-noise amplifier, which might have different parameters, for example, a gain of 50 dB, and a noise figure of, for example, 4.0 dB. After that, a signal is mixed with the signal 217 of the local frequency oscillator 216 and passed through a series of filters to transform it into a signal at intermediate frequency of, for example, 47.74 MHz. This transformed signal is denoted as the output analog signal 211.

The output analog signal 211 is input into the analog-to-digit converter (ADC) 204, which digitizes the analog signal 211. The combination of analog RF processing unit (202) and ADC (204) is commonly referred to as radio-frequency (RF) front-end (210).

The output digital signal 213 is then input into the digital channel processing unit 206, which performs signal search, acquisition and tracking in order to generate raw measurement data, based on signal 217 of the frequency oscillator 216. The raw measurement data, besides code phase and carrier phase measurements, includes GNSS information encoded on the navigation signals (such as satellite ephemeris and satellite clock parameters). The output digital signal 215 is input into the control and computing system 208, which computes target parameters such as position, velocity, and time offset.

The combination of digital channel processing unit (206) and control and computing system (208) is commonly referred to as a receiver digital section (212).

If the receiver operates in a differential navigation mode, the control and computing system 208 receives the correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

Figure 3:
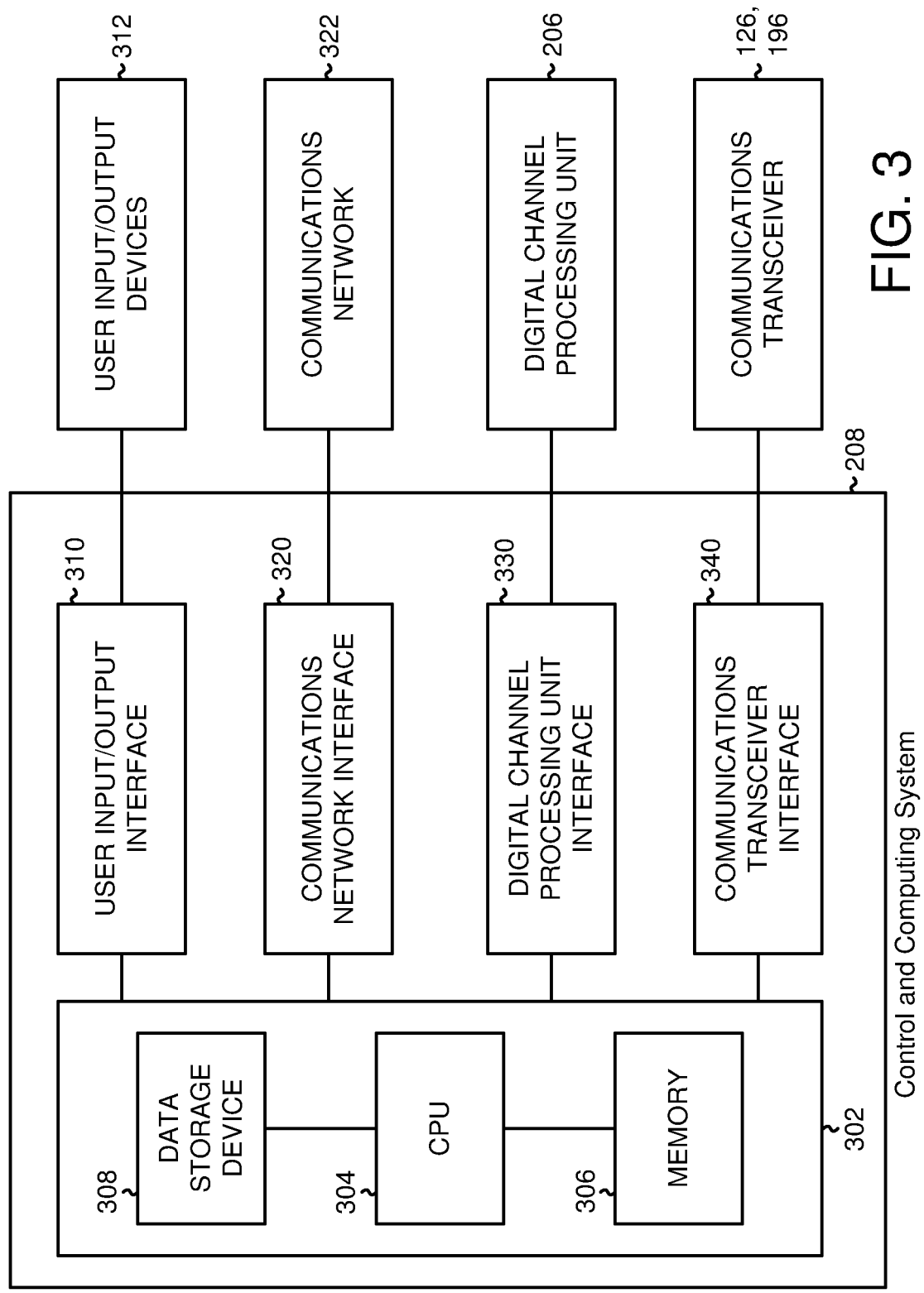
FIG. 3 shows a high-level schematic functional block diagram of a control and computing system implemented within a receiver.

An embodiment of the control and computing system 208 is shown in FIG. 3. One skilled in the art can construct the control and computing system 208 from various combinations of hardware, firmware, and software. One skilled in the art can construct the control and computing system 208 from various electronic components, including one or more general purpose processors (such as microprocessors), one or more digital signal processors, one or more application-specific integrated circuits (ASICs), and one or more field-programmable gate arrays (FPGAs).

The control and computing system 208 includes a computer 302, which includes a processor (referred to as the central processing unit (CPU)) 304, memory 306, and a data storage device 308. The data storage device 308 includes at least one persistent, non-transitory, tangible computer readable medium, such as non-volatile semiconductor memory, a magnetic hard drive, or a compact disc read only memory.

The control and computing system 208 further includes a user input/output interface 310, which interfaces the computer 302 to user input/output devices 312. Examples of user input/output devices 312 include a keyboard, a mouse, a local access terminal, and a video display. Data, including computer executable code, can be transferred to and from the computer 302 via the user input/output interface 310.

The control and computing system 208 further includes a communications network interface 320, which interfaces the computer 302 with a communications network 322. Examples of the communications network 322 include a local area network and a wide area network. A user can access the computer 302 via a remote access terminal (not shown) communicating with the communications network 322. Data, including computer executable code, can be transferred to and from the computer 302 via the communications network interface 320.

The control and computing system 208 further includes a digital channel processing unit interface 330, which interfaces the computer 302 with the digital channel processing unit 206 (see FIG. 2).

The control and computing system 208 further includes a communications transceiver interface 340, which interfaces the computer 302 with a communications transceiver, such as the communications transceiver 126 (see FIG. 1A) or the communications transceiver 196 (see FIG. 1B).

As is well known, a computer operates under control of computer software, which defines the overall operation of the computer and applications. The CPU 304 controls the overall operation of the computer and applications by executing computer program instructions that define the overall operation and applications. The computer program instructions can be stored in the data storage device 308 and loaded into the memory 306 when execution of the program instructions is desired. The algorithms described below can be defined by computer program instructions stored in the memory 306 or in the data storage device 308 (or in a combination of the memory 306 and the data storage device 308) and controlled by the CPU 304 executing the computer program instructions. For example, the computer program instructions can be implemented as computer executable code programmed by one skilled in the art to perform algorithms. Accordingly, by executing the computer program instructions, the CPU 304 executes the algorithms described below.

Figure 4:
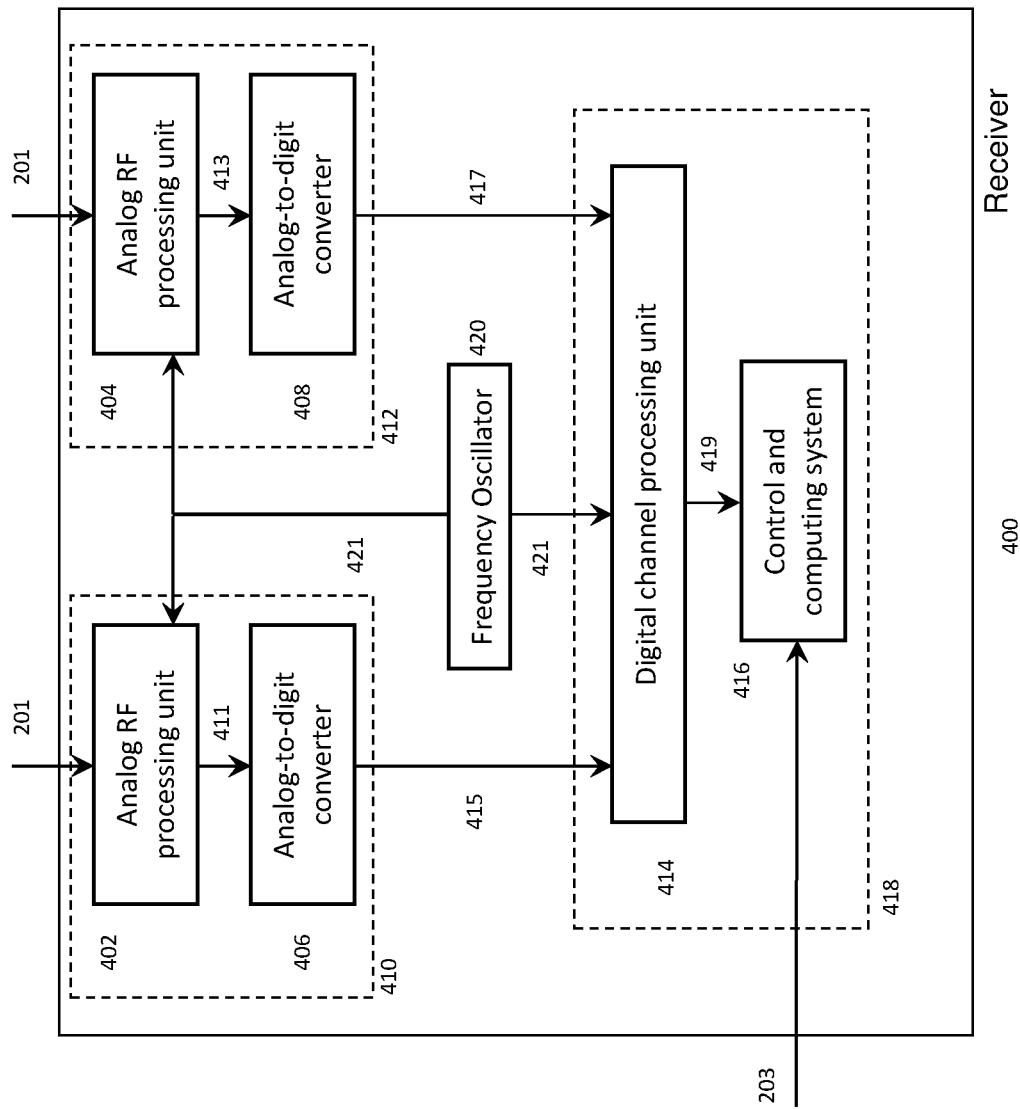
FIG. 4 shows a high-level schematic functional block diagram of a second embodiment of a navigation receiver with multiple front-ends.

FIG. 4 shows a high-level schematic functional block diagram of embodiment of a receiver, denoted as the receiver 400. This receiver has two frontends and a single digital section, controlled with a single frequency oscillator. One skilled in the art can draw a similar diagram for a receiver with more than two frontends and a single digital section.

The input analog signal 201 represents the total signal of all the received navigation signals. For the example shown in FIG. 1A, the input analog signal 201 includes the navigation signals 103A-103F. For the receiver 400 analog signal 201 is measured with two antennas (not shown) coupled to the receiver 400. For a receiver with more than two frontends, the number of antennas is typically equal to the number of frontends.

For the receiver 400, the input analog signal 201 is first inputted into the analog radio frequency (RF) processing units 402 and 404. In the analog RF processing units 402 and 404, the input analog signal 201 is filtered with bandpass filters, centered at the frequency of navigation signals (e.g., 1575.42 MHz), and amplified by low-noise amplifiers, which might have different parameters, for example, a gain of 50 dB, and a noise figure of, e.g., 4.0 dB. After that, these signals are mixed with the signal 421 of the local frequency oscillator 420 and passed through a series of filters to transform them into signals at intermediate frequency of, e.g., 47.74 MHz. These transformed signals are denoted as the output analog signals 411 and 413.

The output analog signals 411 and 413 are input into the analog-to-digit converters (ADC) 406 and 408, which digitize the analog signals 411 and 413. The combinations of analog RF processing units 402 with ADC 406, or 404 with 408 are commonly referred to as RF front-ends (410, or 412).

The output digital signals 415 and 417 are then input into the digital channel processing unit 414, which performs signal search, acquisition and tracking in order to generate raw measurement data, based on signal 421 of the frequency oscillator 420. The navigation data includes GNSS information (such as satellite ephemeris and satellite clock parameters) encoded on the navigation signals. The navigation data also includes code phase measurements (that is, delay times used to determine pseudo-ranges) calculated from delay-locked loops (DLLs). If the navigation receiver processes carrier phases, the navigation data also includes carrier phase measurements calculated from phase-locked loops (PLLs). The output digital signal 419 is input into the control and computing system 416, which computes target parameters such as position, velocity, time offset, and attitude.

The combination of digital channel processing unit 414 and control and computing system 416 is commonly referred to as receiver digital section (418).

If the receiver 400 operates in a differential navigation mode, the control and computing system 416 receives the error correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

In GNSS-related applications, time is measured with respect to a common GNSS system time. Each GNSS has a central synchronizer performing GNSS timekeeping functions. This central synchronizer is typically implemented with a highly stable atomic oscillator located underground in a shielded room. The central synchronizer is also referred to as the GNSS system clock, and the time referenced to the GNSS system clock is the GNSS system time.

Each GNSS satellite and each navigation receiver has its own local reference clock. The local reference clock in a receiver is typically a quartz oscillator, which can have variations in frequency and phase much greater than those of the GNSS system clock. The time referenced to a local clock in a receiver is also referred to as the receiver time scale. The clock in a satellite is typically an atomic clock, more stable than the clock in a receiver, but less stable than the GNSS system clock. The satellite clock is synchronized with the GNSS system clock via periodic measurement sessions made by the GNSS ground control complex. Results of these measurements are the corrections to the satellite clock; values of the corrections are uploaded to the satellite and are broadcast to users. Corrections to the satellite clock calculated by the ground control complex are not absolutely precise, however, because measurements and calculations can have particular errors and because the current drift of the satellite oscillator may not be well represented with the corrections calculated at some time in the past; consequently, there is an offset of the satellite time scale with respect to the GNSS system time.

The difference in time determined by a local clock in a receiver or satellite and the time determined by the GNSS system clock is referred to as the offset of the time scale or as the clock offset.

In order to achieve the highest precision in determination of target parameters, carrier phase measurements shall be used.

To compute the position, RTK algorithms are used. The main problem of any RTK algorithm is to resolve integer carrier phase ambiguities. The success of this process is dependent on GNSS satellite geometry and measurement errors. The success here means that ambiguities are resolved to correct integers as fast as possible. If ambiguities are resolved correctly, carrier phases with extracted ambiguities are used to compute the solution, and this solution will have the accuracy of cm-level. Example of an algorithm for ambiguity resolution can be found in *The LAMBDA Method for Integer Ambiguity Estimation: Implementation Aspects*, by Paul de Jonge and Christian Tiberius, published by LGR-Series Publications of the Delft Geodetic Computing Centre No. 12.

If the spoofing signal impacts the certain area, it impacts identically all the GNSS receivers in the area. The closer the rover is to base, the higher the chances that base and rover will suffer identically from the same spoofer. If base and rover suffer identically from the same spoofer, the baseline length will be determined as being close to zero (regardless of the actual value) within the limits defined by positioning accuracy.

Figure 5:
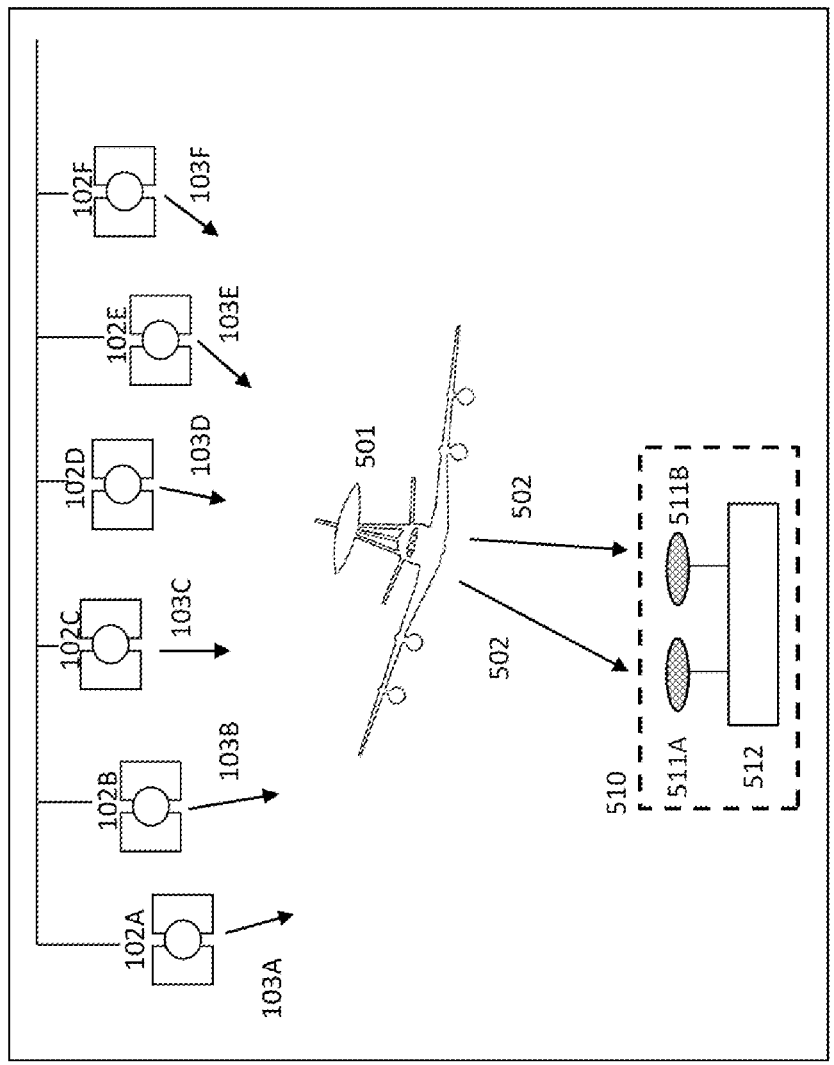
FIG. 5 shows an example of how a spoofing source impacts a receiver with multiple front-ends in which a spoofing detection algorithm is implemented.

So, the first approach to detecting spoofing is to use a receiver with multiple front-ends, which is shown in FIG. 5. FIG. 5 shows an example of first approach to detecting spoofing. In FIG. 5 six representative navigation satellites, denoted 102A-102F transmit navigation signals 103A-103F, respectively. The spoofing source 501 transmits spoofing signals 502. All signals 103A-103F and 502 arrive to a unit 510, that has two antennas 511A and 511B and the receiver with two front-ends 512. Control and computing system of receiver 512 implements the logic of spoofing detection.

Figure 6:
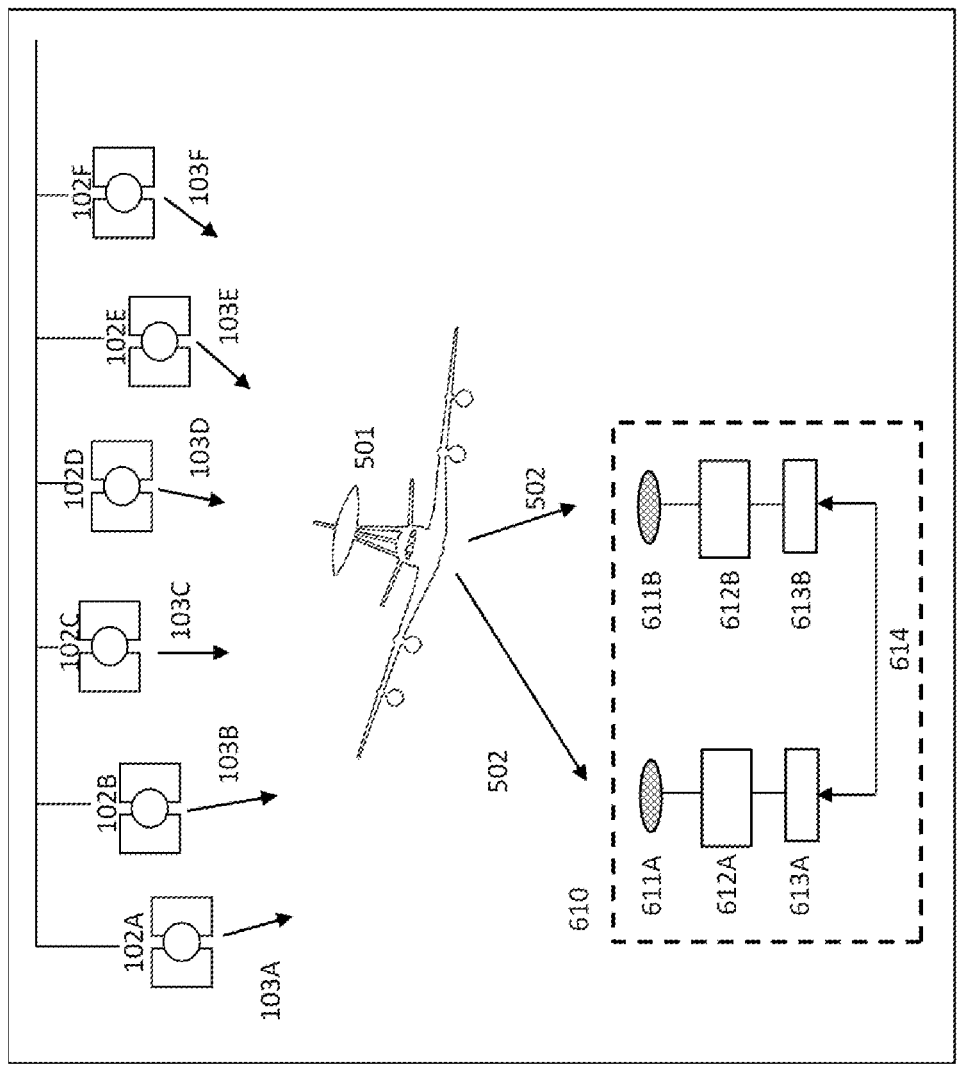
FIG. 6 shows an example of how a spoofing source impacts two receivers connected via communication interface wherein in one of the receivers a spoofing detection algorithm is implemented.

FIG. 6 shows an example of a second approach to detecting spoofing. In FIG. 6, six representative navigation satellites, denoted 102A-102F, transmit navigation signals 103A-103F, respectively. The spoofing source 501 transmits spoofing signals 502. All signals 103A-103F and 502 arrive to unit 610, that includes antennas 611A and 611B, GNSS receivers 612A and 612B, modules 613A and 613B and a communication channel 614. Communication modules 613A and 613B serve as means for data exchange between GNSS receivers 612A and 612B. These communication modules can be based on protocols like RS-232/422/485, USB, LAN/Ethernet, WIFI, BLUETOOTH, UHF, or any other type of wireless link.

In FIG. 6 raw measurement data (or corrections to it) of one GNSS receiver (for example 612A) is sent to another GNSS receiver (for example 612B) via a communication channel 614, and control and computing system of receiver 612B implements the logic of spoofing detection.

Figure 7:
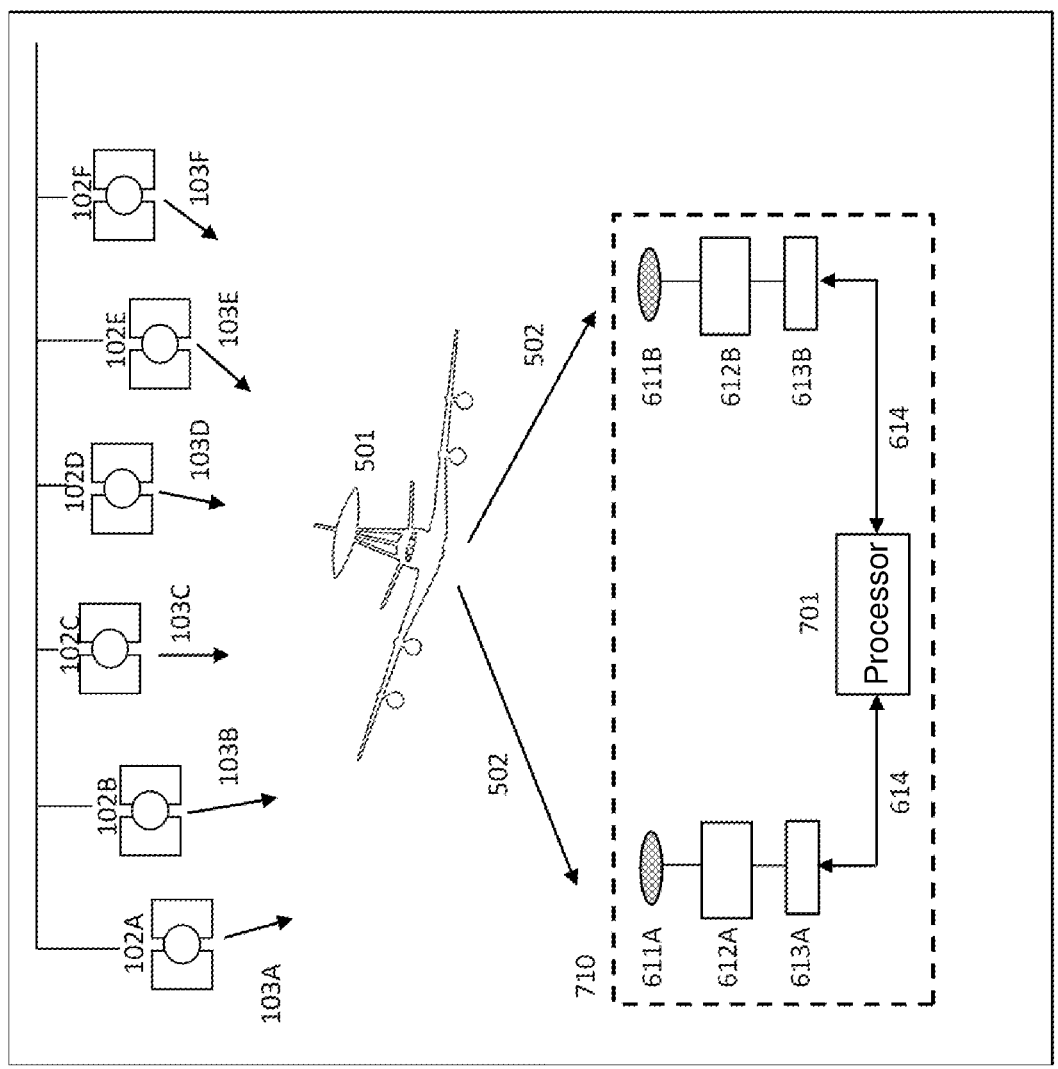
FIG. 7 shows an example of how a spoofing source impacts two receivers connected via communication interface with an external processor, in which a spoofing detection algorithm is implemented.

FIG. 7 shows a modification of second approach to detecting spoofing. In FIG. 7 six representative navigation satellites, denoted 102A-102F, transmit navigation signals 103A-103F, respectively. The spoofing source 501 transmits spoofing signals 502. All signals 103A-103F and 502 arrive to unit 710, consisting of antennas 611A and 611B, GNSS receivers 612A and 612B, modules 613A and 613B, external processor 701 and a communication channel 614. Communication modules 613A and 613B serve as means for data exchange between GNSS receivers 612A and 612B. These communication modules can be based on protocols like RS-232/422/485, USB, LAN/Ethernet, WIFI, BLUETOOTH, UHF, or on any other type of wireless link.

In FIG. 7 raw measurement data (or corrections to it) of both GNSS receivers 612A and 612B are sent to external processor 701, and this processor implements the logic of spoofing detection.

Typical GNSS receivers have built-in RS-232/422/485, USB, LAN/Ethernet modules, and modules 613A-613B are shown in FIGS. 6-7 to illustrate the generality of the concept.

As soon as spoofing signal 502 is more powerful rather than navigation signals 103A-103F, units 510, 610, 710 will track the spoofing signal instead of navigation signals 103A-103F.

It is reasonable to have a distance between antennas 511A and 511B, and 611A and 611B neither too big nor too small-something in the interval of 0.1 m to 3 m, where the upper bound is limited by physical dimensions of the vehicle, where units 510, 610, 710 are installed. The lower bound is determined with an accuracy of carrier phase raw measurement data.

The following describes the specifics of an approach shown in FIG. 6, or FIG. 7, as it represents the more general case. In this approach, raw measurement data from two antennas (hereafter, antenna 1 and antenna 2), connected to different receivers, are sent to a control and computing system of one of the receivers, or to external processor for further analysis. The first step of data processing, is differencing measurements from antenna 1 and antenna 2, referenced to the same instant of time within the GNSS time scale. Such differences are commonly referred to as the "single differences":

$$\Delta C^j = C_B^j - C_R^j = R_B^j - R_R^j + \Delta T^j + \Delta I^j + \Delta e^j + \Delta \tau^j + B_C + \Delta \xi^j \quad (1)$$

$$\Delta P^j = \\ P_B^j - P_R^j = R_B^j - R_R^j + \Delta T^j - \Delta I^j + \Delta e^j + \Delta \tau^j + B_P + \Delta N^j \times \lambda^j + \Delta \eta^j \quad (2)$$

where:
Δ—differencing operator
j—index of GNSS satellite
$C_1^j$, $C_2^j$—code phase pseudo-range measurements collected at antenna 1 and 2 respectively, with j-th GNSS satellite
$P_1^j$, $P_2^j$—carrier phase pseudo-range measurements collected at antenna 1 and 2 respectively, with j-th GNSS satellite
$R_1^j$, $R_2^j$—true distances between antenna 1 and j-th GNSS satellite, and antenna 2 and j-th GNSS satellite respectively
$\Delta T^j$—difference of signal delays due to troposphere for antenna 1 and 2 with respect to j-th GNSS satellite
$\Delta I^j$—difference of signal delays due to ionosphere for antenna 1 and 2 with respect to j-th GNSS satellite
$\Delta e^j$—difference of GNSS ephemeris errors projections onto distances between antenna 1 and j-th GNSS satellite, and antenna 2 and j-th GNSS satellite $\Delta \tau^j$—difference of GNSS clock error impacts onto distances between antenna 1 and j-th GNSS satellite, and antenna 2 and j-th GNSS satellite $B_C$—various biases common for code phase measurement difference of all GNSS satellites (including difference of clock offsets between receivers connected to antenna 1 and 2)

$B_P$—various biases common for carrier phase measurement difference of all GNSS satellites (including difference of clock offsets between receivers connected to antenna 1 and 2)

$\Delta N^j$—difference of carrier phase ambiguities between measurements collected at antenna 1 and 2 with j-th GNSS satellite $\lambda^j$—wavelength of carrier phase measurements of the j-th GNSS satellite $\Delta \xi^j$—difference of code noise and code multipath errors $\Delta \eta^j$—difference of carrier noise and carrier multipath errors As result of differencing, mutual errors in measurements collected at antenna 1 and 2 cancel out, since they are correlated. In fact, if the correlation is strong enough (which basically holds true for short baselines, as in this case) equations (1) and (2) for the single differences can be re-written as follows:

$$\Delta C^j = C_1^j - C_2^j = R_1^j - R_2^j + B_C + \Delta \xi^j \qquad (3)$$

$$\Delta P^j = P_1^j - P_2^j = R_1^j - R_2^j + B_P + \Delta N^j \times \lambda^j + \Delta \eta^j \qquad (4)$$

The next step of processing is generating so-called double differences. In order to generate the double differences, one of the GNSS satellites is selected as the reference one. As result of forming double differences bias terms $B_C$ and $B_P$ cancel out.

Consider that the k-th GNSS satellite was chosen as the reference, then, equations (3) and (4) for any j-th GNSS satellite are transformed as follows:

$$\nabla \Delta C^{k,j} = C_1^k - C_2^k - C_1^j + C_2^j = R_1^k - R_2^k - R_1^j + R_2^j + \Delta \xi^k - \Delta \xi^j = \qquad (5)$$
$$= \nabla \Delta R^{k,j} + \nabla \Delta \xi^{k,j}$$

$$\nabla \Delta P^{k,j} = \qquad (6)$$
$$P_1^k - P_2^k - P_1^j + P_2^j = R_1^k - R_2^k - R_1^j + R_2^j + \Delta N^k \times \lambda^k - \Delta N^j \times \lambda^j + \Delta \eta^k -$$
$$\Delta \eta^j = \nabla \Delta R^{k,j} + \nabla \Delta N^{k,j} \times \lambda + \nabla \Delta \eta^{k,j}$$

where:

$\nabla \Delta$—double difference operator;

$\lambda^k = \lambda^j = \lambda$ for GNSS with code division multiple access (CDMA).

In formulas 5 and 6, the term $\nabla \Delta R^{k,j}$ is proportional to a distance between two antennas. If the distance is zero, this term cancels out;

Under spoofing, two antennas receive the same signal. As result, under spoofing, the term $\nabla \Delta R^{k,j}$ would tend to zero despite the fact that the antennas are separated. Therefore, to detect spoofing one can check, if:

$$\nabla \Delta C^{k,j} \leq Tr1 \qquad (7)$$

where Tr1 is a threshold determined with values of $\nabla \Delta \xi^{k,j}$

For example, a threshold value can be determined as:

$$Tr1 = 3 \times \sigma_{\nabla \Delta \xi^{k,j}} \qquad (8)$$

where $\sigma_{\nabla \Delta \xi^{k,j}}$-standard deviation of $\nabla \Delta \xi^{k,j}$ If relationship (7) holds true for the majority of measurements, then a spoofing alert should be issued.

Understanding that code phase errors are on the order of a meter, one should select values for Tr1 as big as 1.0-10.0 meters, which requires antennas to be separated with a relatively large distance, which is not often possible on small vehicles, like cars or drones.

Thus, it may be more practical to use carrier phases to detect spoofing. In order to do this, carrier phase ambiguities should be excluded from (6):

$$\overline{\nabla \Delta P^{k,j}} = \nabla \Delta P^{k,j} - \text{round}(\nabla \Delta P^{k,j}/\lambda) \qquad (9)$$

where: round—is a procedure of rounding to the nearest integer

So, to detect spoofing one can check, if:

$$\overline{\nabla \Delta P^{k,j}} \leq Tr2 \qquad (10)$$

where Tr2 is a threshold determined with values of $\nabla \Delta \eta^{k,j}$

For example, a threshold value can be determined as:

$$Tr2 = 3 \times \sigma_{\nabla \Delta \eta^{k,j}} \qquad (11)$$

where $\sigma_{\nabla \Delta \eta^{k,j}}$-standard deviation of $\nabla \Delta \eta^{k,j}$ If relationship (10) holds true for the majority of measurements, then a spoofing alert should be issued.

Understanding that carrier phase errors are on the centimeter level, one should select values for Tr2 as large as 0.01-0.05 meters, which makes it possible to have antenna separation small, for example equal to 0.1 m, or larger, if possible, and this is well suited for such applications as cars or drones.

The following relates to the approach represented in FIG. 5. In case of a receiver with two front-ends and a single digital section (as in FIG. 5), the bias terms in equations (3) and (4) cancel out due to hardware specifics, and equations for single differences are as follows:

$$\Delta C^j = C_1^j - C_2^j = R_1^j - R_2^j + \Delta \xi^j \qquad (12)$$

$$\Delta P^j = P_1^j - P_2^j = R_1^j - R_2^j + \Delta N^j \times \lambda^j + \Delta \eta^j \qquad (13)$$

In this case, there is no need to make double differences, and to detect spoofing one can check if:

$$\Delta C^j \leq Tr3 \qquad (14)$$

where Tr3 is a threshold determined with values of $\Delta \xi^j$

For example, a threshold value can be determined as:

$$Tr3 = 3 \times \sigma_{\Delta\xi^j} \qquad (15)$$

where $\sigma_{\Delta\xi^j}$-standard deviation of $\Delta\xi^j$

If relationship (14) holds true for the majority of measurements, then a spoofing alert should be issued.

Similarly to relationship (7), one should select values for Tr3 on the order of a meters. Thus, it is more practical to use carrier phases to detect spoofing.

Carrier phase single differences are used for spoofing detection as follows:

$$\overline{\Delta P^j} = \Delta P^j - \text{round}(\Delta P^j/\lambda) \qquad (16)$$

To detect spoofing one can check, if:

$$\overline{\Delta P^j} \le Tr4 \qquad (17)$$

where Tr4 is a threshold determined with predicted values of $\Delta\eta^j$

For example, a threshold value can be determined as:

$$Tr4 = 3 \times \sigma_{\Delta\eta^j} \qquad (18)$$

where $\sigma_{\Delta\eta^j}$-standard deviation of $\Delta\eta^j$

If relationship (17) holds true for the majority of measurements, then a spoofing alert should be issued.

Similarly to relationship (11), one should select values for Tr4 on the order of a centimeters.

In addition to measurement errors $\sigma_{\nabla\Delta\xi^{k,j}}$, $\sigma_{\nabla\Delta\eta^{k,j}}$, $\sigma_{\Delta\xi^j}$, $\sigma_{\Delta\eta^j}$ some other parameters can be used to compute the values for thresholds Tr1, Tr2, Tr3, Tr4. For example, threshold values can be proportional to signal-to-noise ratio and a satellite elevation angles above the horizon.

For double differences the thresholds might be computed as follows:

$$Tr1 = \frac{3 \times \sigma_{\nabla\Delta\xi^{k,j}}}{\sqrt{SNR^j \times (\sin El^j + 0.001) \times SNR^k \times (\sin El^k + 0.001)}} \qquad (19)$$

$$Tr2 = \frac{3 \times \sigma_{\nabla\Delta\eta^{k,j}}}{\sqrt{SNR^j \times (\sin El^j + 0.001) \times SNR^k \times (\sin El^k + 0.001)}} \qquad (20)$$

where $SNR^j$, $SNR^k$—signal-to-noise ratios for j-th and k-th satellites respectively $El^j$, $El^k$—elevations for j-th and k-th satellites respectively For single differences the thresholds might be computed as follows:

$$Tr3 = \frac{3 \times \sigma_{\Delta\xi^j}}{SNR^j \times (\sin El^j + 0.001)} \qquad (21)$$

$$Tr4 = \frac{3 \times \sigma_{\Delta\eta^j}}{SNR^j \times (\sin El^j + 0.001)} \qquad (22)$$

As result of applying test procedures (7), or (10), or (14), or (17) to incoming GNSS raw measurements, it becomes possible for receiver algorithms to determine the fact of spoofing and issue an alert flag to a user. An example reaction to this alert flag can be ceasing the use of the position output by the GNSS receiver, thus avoiding to be misled by a culprit.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. An apparatus for detecting global navigation satellite system (GNSS) spoofing, the apparatus comprising:
 a GNSS receiver that includes
  a first radio-frequency front-end (RF1) connected to antenna 1;
  a second radio-frequency front-end (RF2) connected to antenna 2;
  a digital section connected to both RF1 and RF2 and controlled with a single frequency oscillator;
 wherein the digital section
  (i) generates a first set of GNSS raw measurements based on signals received from antenna 1;
  (ii) generates a second set of GNSS raw measurements based on signals received from antenna 2;
  (iii) computes single differences between simultaneous raw measurements, generated with the signals received from the antenna 1 and the antenna 2 for the same GNSS satellite;
  (iv) compares the single differences with a threshold; and
  (v) issues a spoofing alert when more than one of the single differences is below the threshold.

2. The system of claim 1, wherein the single differences are generated for code phase measurements.

3. The system of claim 1, wherein the single differences are generated for carrier phase measurements, and prior making the comparison in (iv), integer ambiguities are excluded from the single differences.

4. The system of claim 1, wherein the GNSS raw measurements include raw measurements from any of GPS, GLONASS, GALILEO, Beidou, SBAS, and QZSS satellites.

5. The system of claim 1, wherein the raw measurements include data collected in any of L1, L1P, L1C, L2, L2P, L2C, L5/L3, E5a, E5b, E5AB, E6, B1, B2, B3 bands.

6. The system of claim 1, wherein the threshold in (iv) is proportional to expected measurement errors.

7. The system of claim 1, wherein the threshold in (iv) is proportional to satellite elevation angle above the horizon.

8. The system of claim 1, wherein the threshold in (iv) is proportional to real-time estimates of signal-to-noise ratio.

9. The system of claim 1, wherein the antenna 1 and the antenna 2 are fixed with respect to each other, so as to maintain the constant distance between them.

10. The system of claim 1, wherein a distance between the antenna 1 and the antenna 2 is larger than expected raw measurement data errors.

11. A method for detecting global navigation satellite system (GNSS) spoofing, the method comprising:
 in a GNSS receiver with two radio-frequency front-ends and a single digital section, receiving the signals from GNSS satellites at a first radio-frequency front-end (RF1) connected to antenna 1;
receiving the signals from GNSS satellites at a second radio-frequency front-end (RF2) connected to antenna 2;
processing the received signals in a digital section connected to both RF1 and RF2 and controlled with a single frequency oscillator;
wherein the processing includes
  (i) generating a first set of GNSS raw measurements based on signals received from antenna 1;
  (ii) generating a second set of GNSS raw measurements based on signals received from antenna 2;
  (iii) computing first differences between simultaneous raw measurements, generated with the signals received from the antenna 1 and the antenna 2 for the same GNSS satellite;
  (iv) comparing the single differences with a threshold; and
  (v) issuing a spoofing alert when more than one of the single differences is below a threshold.

12. An apparatus for detecting global navigation satellite system (GNSS) spoofing, the apparatus comprising:
a GNSS receiver 1 connected to antenna 1;
a GNSS receiver 2 connected to antenna 2,
wherein the GNSS receiver 1 and the GNSS receiver 2 are linked using a communication interface, and
wherein:
  (i) the GNSS receiver 1 generates a first set of GNSS raw measurements based on signals received from the antenna 1;
  (ii) the GNSS receiver 2 generates a second set of GNSS raw measurements based on signals received from the antenna 2;
  (iii) the first set of GNSS raw measurements is forwarded from the GNSS receiver 1 to the GNSS receiver 2 via the communication interface;
  (iv) a control and computing system of the GNSS receiver 2 computes single differences between simultaneous raw measurements, generated with the signals received from the antenna 1 and the antenna 2 for the same GNSS satellite;
  (v) the control and computing system selects a reference GNSS satellite and computes double differences between the single difference for the reference satellite and the single differences for other satellites;
  (vi) the control and computing system compares double differences with a threshold;
  (vii) the control and computing system issues a spoofing alert when more than one of the double differences is below a threshold.

13. The apparatus of claim 12, wherein the double differences are generated for code phase measurements.

14. The apparatus of claim 12, wherein the double differences are generated for carrier phase measurements, and prior to the comparison in (vi), integer ambiguities are excluded from the double differences.

15. The apparatus of claim 12, wherein the GNSS raw measurements include raw measurements from any of GPS, GLONASS, GALILEO, Beidou, SBAS, and QZSS satellites.

16. The apparatus of claim 12, wherein the raw measurements include data collected in any of L1, L1P, L1C, L2, L2P, L2C, L5/L3, E5a, E5b, E5AB, E6, B1, B2, B3 bands.

17. The apparatus of claim 12, wherein the threshold in (vii) is proportional to expected measurement errors.

18. The apparatus of claim 12, wherein the threshold in (vii) is proportional to satellite elevation angle above the horizon.

19. The apparatus of claim 12, wherein the threshold in (vii) is proportional to real-time estimations of signal-to-noise ratio.

20. The apparatus of claim 12, wherein the antenna 1 and the antenna 2 are fixed with respect to each other, in order to maintain a constant distance between them.

21. The apparatus of claim 12, wherein a distance between the antenna 1 and the antenna 2 is larger than expected raw measurement data errors.

22. The apparatus of claim 12, wherein the communication interface between the GNSS receiver 1 and the GNSS receiver 2 is any of RS-232/422/485, USB, LAN/Ethernet or WIFI interfaces.

23. An apparatus for detecting global navigation satellite system (GNSS) spoofing, the apparatus comprising:
a GNSS receiver 1 connected to antenna 1;
a GNSS receiver 2 connected to antenna 2; and
an external processor, linked to the GNSS receiver 1 and the GNSS receiver 2 with communication interfaces,
wherein:
  (i) the GNSS receiver 1 generates a first set of GNSS raw measurements based on signals received from the antenna 1;
  (ii) the GNSS receiver 2 generates a second set of GNSS raw measurements based on signals received from the antenna 2;
  (iii) the first set of GNSS raw measurements is forwarded from the GNSS receiver 1 to the external processor via the communication interface;
  (iv) the second set of GNSS raw measurements is forwarded from the GNSS receiver 2 to the external processor via the communication interface;
  (v) the external processor computes single differences between simultaneous raw measurements, generated with the signals received from the antenna 1 and the antenna 2 for the same GNSS satellite;
  (vi) the external processor selects a reference GNSS satellite and computes double differences between the single difference for the reference satellite and the single differences for other satellites;
  (vii) the external processor compares double differences with a threshold;
  (viii) the external processor issues a spoofing alert when more than one of the double differences is below a threshold.

24. A method for detecting global navigation satellite system (GNSS) spoofing, the method comprising:
receiving a GNSS signal at a GNSS receiver 1 connected to antenna 1;
receiving the GNSS signal at a GNSS receiver 2 connected to antenna 2,
wherein the GNSS receiver 1 and the GNSS receiver 2 are linked using a communication interface;
at the GNSS receiver 1, generating a first set of GNSS raw measurements based on signals received from the antenna 1;
at the GNSS receiver 2, generating a second set of GNSS raw measurements based on signals received from the antenna 2;
forwarding the first set of GNSS raw measurements from the GNSS receiver 1 to the GNSS receiver 2 via the communication interface;

computing single differences between simultaneous raw measurements, generated with the signals received from the antenna 1 and the antenna 2 for the same GNSS satellite;

selecting a reference GNSS satellite and computing double differences between the single difference for the reference satellite and the single differences for other satellites;

comparing the double differences with a threshold; and issuing a spoofing alert when more than one of the double differences is below a threshold.

\* \* \* \* \*